Oct. 18, 1960   C. KATES   2,956,822
WELL SEAL

Filed June 2, 1958   2 Sheets-Sheet 1

INVENTOR.
CHARLES KATES
BY
*Isler & Ornstein*
ATTORNEYS

Oct. 18, 1960   C. KATES   2,956,822
WELL SEAL
Filed June 2, 1958   2 Sheets-Sheet 2

INVENTOR.
CHARLES KATES
BY
Isler & Ornstein
ATTORNEYS

United States Patent Office 2,956,822
Patented Oct. 18, 1960

2,956,822

WELL SEAL

Charles Kates, Shaker Heights, Ohio, assignor to The Union Malleable Manufacturing Company, Ashland, Ohio, a corporation of Ohio Filed June 2, 1958, Ser. No. 739,287

3 Claims. (Cl. 285—137)

This invention relates generally to well seals, but has reference more particularly to an improved type of well seal, in which a minimum number of parts is used to establish the seal.

It has heretofore been the practice in making well seals of the type herein described, to utilize a metallic top plate and a metallic bottom plate, which are inserted into the well casing, along with a thick rubber gasket interposed between the plates, so that when the plates are drawn together, as by means of bolts and nuts, the rubber gasket is compressed and expanded against the well casing and the supply pipes which extend into the casing.

The present invention has as its primary object the provision of a seal of the type described, in which a highly effective seal is obtained by using only a single metallic plate, instead of two plates, and using a novel plastic plate, in lieu of the thick rubber gasket heretofore employed.

Another object of the invention is to provide a seal of the character described, in which the parts of the seal are so formed, as to produce by their coaction, through the use of bolts and nuts, a tight, waterproof seal, which is effective to seal the well off completely, permitting no outside or surface water or bacteria to enter the well.

A further object of the invention is to provide a seal of the character described, in which steel and plastic parts are used exclusively.

Other objects and advantages of my invention will be apparent during the course of the following description.

In the accompanying drawings forming a part of this specification, and in which like numerals are employed to designate like parts throughout the same, Fig. 1 is a top plan view, showing the seal, as applied to a well casing;

Figure 1:
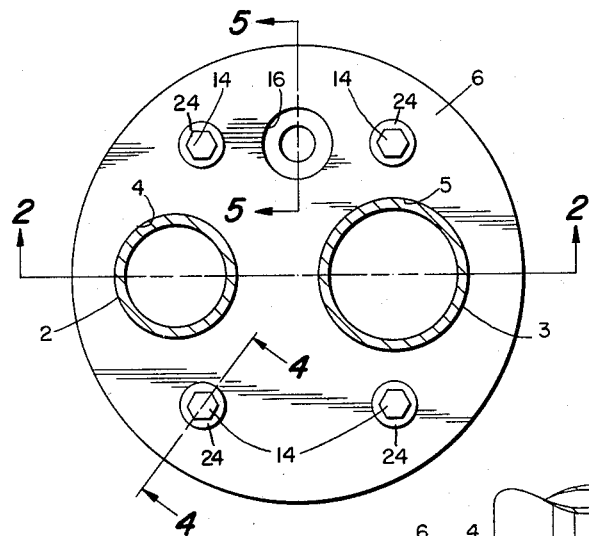

Referring more particularly to the drawings, reference numeral 1 designates the upper end of a well casing, into which supply pipes 2 and 3 extend.

The supply pipes extend through opening 4 and 5 respectively in a top plate 6, which is mounted on the upper end of the casing 1, and is preferably made from a relatively soft, flexible plastic, such, for example, as polyethylene.

The plate 6 has a portion 7 of reduced external diameter which fits loosely in the upper end of the casing 1, and which terminates in an annular collar or flanges 8, having a radially-inward surface 9, which is outwardly inclined.

The plate 6 is also provided with depending annular collars or flanges 10 and 11, adjacent the openings 4 and 5 respectively, and these collars or flanges having radially-outward surfaces 12 which are inclined oppositely to the inclination of the surface 9.

The top plate 6 is also provided with circumferentially-spaced openings 13, for the passage therethrough of bolts 14, the plate being provided adjacent the upper ends of these openings with annular flanges 15, which serve a purpose to be presently described.

The plate is also provided with an additional threaded opening 16 for the passage of an electrical cable (not shown) used in connecting a submersible pump, and which opening, when the cable is not used, is plugged with a pipe plug.

The well seal further includes a bottom plate 17, which is preferably made as a steel stamping, and comprises a disc-like body portion, having a depending peripheral or annular flange 18, which is outwardly inclined, and annular flanges 19 and 20 which are inwardly inclined and provide openings for the passage therethrough of the supply pipes 2 and 3.

The bottom plate 17 is also provided with circumferentially-spaced openings 21, for the passage therethrough of the bolts 14, and with an additional opening 22 for passage of the above mentioned cable.

The well seal further includes nuts 23 and washers 24.

In forming the seal, the plates 6 and 17, loosely connected to each other by means of the bolts 14, nuts 23, and washers 24, are mounted in the upper end of the well casing, and the supply pipes 2 and 3 passed through the openings 4 and 5 and the corresponding openings in the plate 17 which are formed by the flanges 19 and 20.

Figure 2:
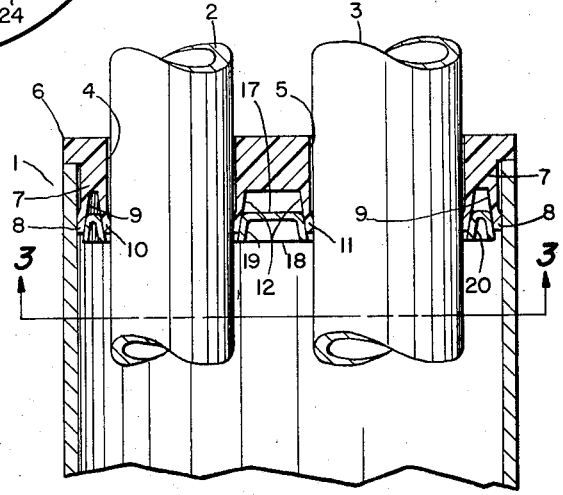
Fig. 2 is a cross-sectional view, taken on the line 2—2 of Fig. 1.
Figure 3:
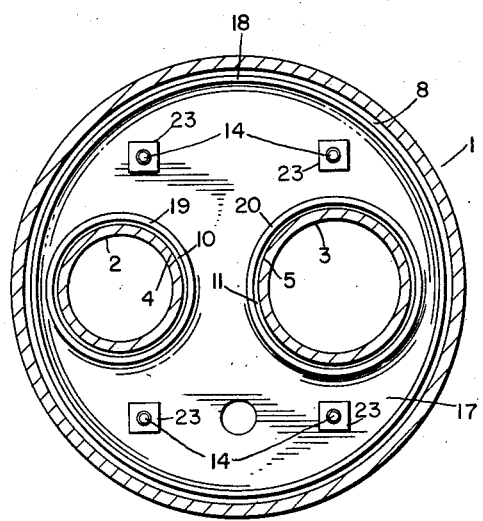
Fig. 3 is a cross-sectional view, taken on the line 3—3 of Fig. 2.
Figure 4:
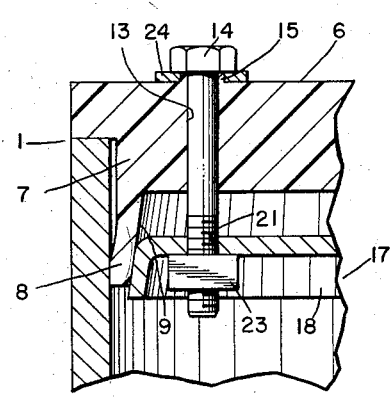
Fig. 4 is a fragmentary cross-sectional view taken on the line 4—4 of Fig. 1.
Figure 5:
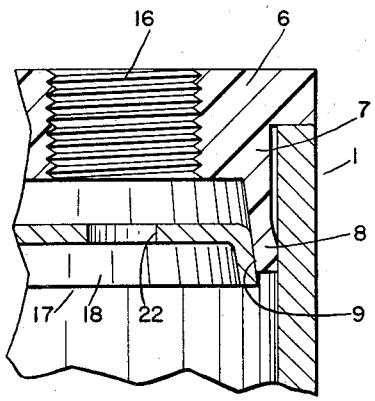
Fig. 5 is a fragmentary cross-sectional view taken on the line 5—5 of Fig. 1.
Figure 6:
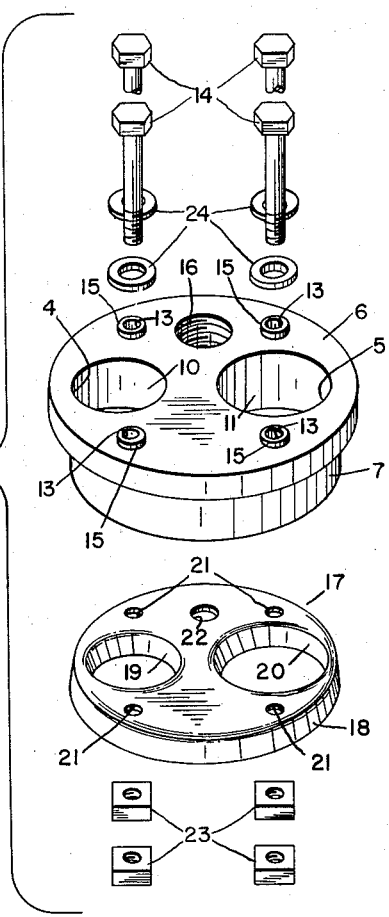
Fig. 6 is an exploded view of the parts of the well seal.

The bolts 14 are then turned to draw the plate 17 tightly up to the plate 6, in the manner shown in Figs. 2 and 4. As a result, the flange 18 engages the surface 9 of the flange 8, causing the flange 8 to move radially-outwardly and snugly engage the inner wall of the casing 1, thereby providing a tight seal between the plate 6 and the casing. At the same time, the flanges 19 and 20 engages the surfaces 12 of the flanges 10 and 11 of the plate 6, causing the flanges 10 and 11 to move radially-inwardly and snugly engage the outer walls of the supply pipes 2 and 3, thereby providing a tight seal between the plate 6 and the supply pipes. Moreover, the annular plastic flanges 15 are drawn up tightly against the bolts 14, thereby sealing off any possibility of entry of any matter around the bolts. In this manner, a highly effective seal is obtained, which permits no outside or surface matter or bacteria to enter the well.

The seal is economical, because it uses only a single metallic plate, instead of two plates, and uses a single, easily molded plastic plate, instead of the thick rubber gasket heretofore employed.

It is to be understood that the form of my invention, herewith shown and described, is to be taken as a preferred example of the same, and that various changes may be made in the shape, size and arrangement of parts of my invention, without departing from the spirit of the invention or the scope of the subjoined claims.

Having thus described my invention, I claim:

1. A well seal, comprising a casing, a flat plate of compressible plastic material disposed in said casing, and having an annular depending flange disposed adjacent the inner wall of said casing and formed integrally with the plate, and being provided also with spaced openings for the passage therethrough of supply pipes, and with annular depending flanges surrounding said supply pipes and formed integrally with the plate, a metallic plate having a depending inclined annular flange adapted to engage the first annular flange of the first plate and having also depending inclined annular flanges encompassing and adapted to engage the annular flanges of the first plate which surround said supply pipes, and means for drawing said plates together, whereby the first annular flange of the metallic plate forces the first annular flange of the first plate into sealing engagement with the inner wall of the casing, and the second-named annular flanges of the metallic plate simultaneously force the second-named annular flanges of the first plate into sealing engagement with said supply pipes.

2. A well seal, as defined in claim 1, in which said means comprises nuts and bolts, said bolts extend entirely through said plates, and said first plate is provided with annular flanges on its upper surface formed integrally therewith and surrounding said bolts and adapted to be forced into sealing engagement with said bolts, when said plates are drawn together.

3. A well seal, as defined in claim 2, including washers encompassing said last-named flanges and effective to prevent said last-named flanges from spreading radially-outwardly when said flanges are thus forced into sealing engagement with said bolts.

References Cited in the file of this patent

UNITED STATES PATENTS

| | | | |
|---|---|---|---|
| 658,860 | Nungesser | Oct. 2, | 1900 |
| 1,851,940 | Williams | Mar. 29, | 1932 |
| 2,092,182 | Ray | Sept. 7, | 1937 |
| 2,476,074 | Unger | July 12, | 1949 |
| 2,592,130 | Erb | Apr. 8, | 1952 |
| 2,603,347 | Fish | July 15, | 1952 |
| 2,631,869 | Warp | Mar. 17, | 1953 |
| 2,681,816 | Smith | June 22, | 1954 |
| 2,735,697 | Zanin | Feb. 21, | 1956 |
| 2,800,242 | Sauthoff | July 23, | 1957 |
| 2,831,619 | Cowie | Apr. 22, | 1958 |